United States Patent [19]

Zelenka

[11] Patent Number: 5,278,405
[45] Date of Patent: Jan. 11, 1994

[54] METHOD AND APPARATUS FOR THE CORRECTION OF POSITIONING ERRORS OF A DEFLECTED LIGHT RAY

[75] Inventor: Thomas Zelenka, Moenkeberg, Fed. Rep. of Germany

[73] Assignee: Linotype-Hell AG, Fed. Rep. of Germany

[21] Appl. No.: 867,208

[22] PCT Filed: Dec. 16, 1990

[86] PCT No.: PCT/DE90/00966
§ 371 Date: Sep. 1, 1992
§ 102(e) Date: Sep. 1, 1992

[87] PCT Pub. No.: WO91/10210
PCT Pub. Date: Jul. 11, 1991

[30] Foreign Application Priority Data

Jan. 5, 1990 [DE] Fed. Rep. of Germany ....... 4000166

[51] Int. Cl.$^5$ ............................................ H01J 3/14
[52] U.S. Cl. ..................................... 250/235; 358/497
[58] Field of Search ..................... 250/234, 235, 236;
358/494, 497, 481; 359/216, 217

[56] References Cited

U.S. PATENT DOCUMENTS

| | | | |
|---|---|---|---|
| 4,002,830 | 1/1977 | Brown et al. | 358/293 |
| 4,257,053 | 3/1981 | Gilbreath | 346/108 |
| 4,351,005 | 9/1982 | Imai et al. | 358/300 |
| 4,404,596 | 9/1983 | Juergensen et al. | 358/293 |
| 4,420,760 | 12/1983 | Phillips | 346/108 |
| 4,675,696 | 6/1987 | Suzuki | 346/46 |
| 4,829,175 | 5/1989 | Goto et al. | 250/236 |
| 4,870,273 | 9/1989 | Brueggemann | 250/235 |
| 4,873,435 | 10/1989 | Ono et al. | 250/235 |

FOREIGN PATENT DOCUMENTS

| | | | |
|---|---|---|---|
| 0159024A2 | 10/1985 | European Pat. Off. | G02B 26/00 |
| 2443379 | 3/1976 | Fed. Rep. of Germany | G02B 27/17 |
| 3613917A1 | 10/1986 | Fed. Rep. of Germany | B41J 3/21 |
| 3445751C2 | 6/1987 | Fed. Rep. of Germany | G02B 7/04 |

Primary Examiner—David C. Nelms
Attorney, Agent, or Firm—Hill, Steadman & Simpson

[57] ABSTRACT

The invention is directed to a method and to an apparatus for the correction of the positioning errors of a light ray deflected across a surface by a deflection system comprising at least one mirror face, said light ray moving transversely vis-a-vis the line direction relative to the deflection system. The light ray is generated with a laser diode that is displaceable transversely relative to the direction of the emerging light ray dependent on correction values. Before the actual operation, a plurality of positioning errors of the light ray are measured for every mirror face of the deflection system in the line direction (X-positioning error) and perpendicularly thereto (Y-positioning errors), measurements are made at measuring points orientated in the line direction on the surface. At least one X-correction value and one Y-correction value is generated for every mirror face. The laser diode is displaced such dependent on the X-correction values and on the Y-correction values such that the light ray incident onto the surface experiences correction displacements in and perpendicularly vis-a-vis the line direction for the elimination of the X-positioning errors and of the Y-positioning errors. Given simultaneous checking of the positioning errors, the correction values are varied until the positioning errors are compensated. The correction values calculated in this way are stored and are output during actual operation for continuous error compensations synchronized with the motion of the deflection system.

18 Claims, 3 Drawing Sheets

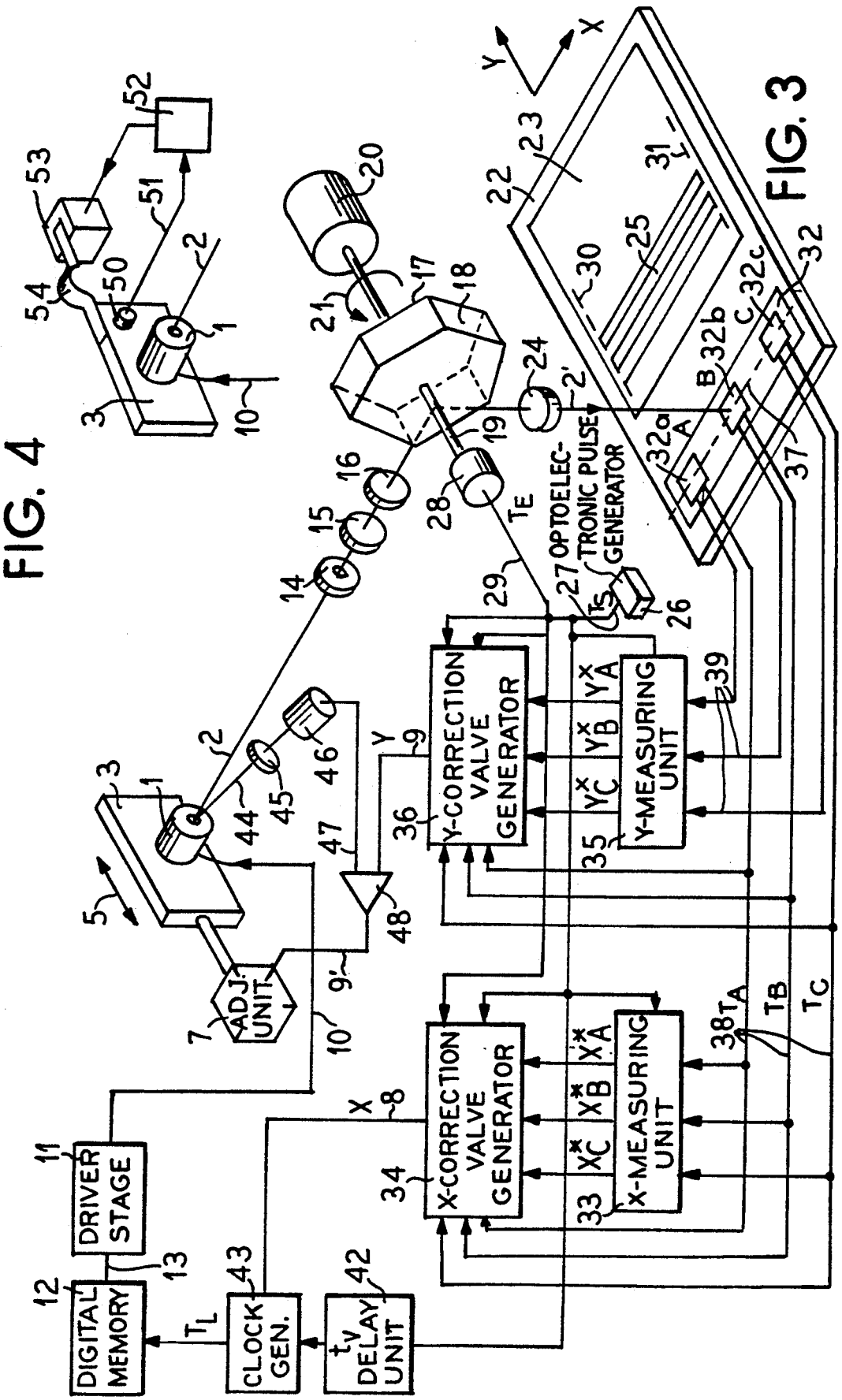

METHOD AND APPARATUS FOR THE CORRECTION OF POSITIONING ERRORS OF A DEFLECTED LIGHT RAY

BACKGROUND OF THE INVENTION

The invention relates to the field of electronic reproduction technology and is directed to a method and to an apparatus for the correction of positioning errors of a light ray in a flying spot laser scanner deflected Point-by-point and line-by-line by a deflection system comprising at least one mirror surface, particularly by a multi-face rotating mirror.

Flying spot laser scanners are employed in electronic reproduction technology as input scanners for point-by-point and line-by-line scanning of originals or as an output scanner for recording information. In an input scanner, a light ray is conducted over an original point-by-point and line-by-line with a deflection system and the scan light allowed to pass by or reflected from the original is converted into an image signal in an opto-electronic transducer. In an output scanner (recorder), a light ray that is intensity-modulated by an image signal is conducted across a recording medium point-by-point and line-by-line with a deflection system. The original or recording medium, referred to below as a surface, thereby move continuously or in steps perpendicularly to the line direction of the deflected light ray.

In order to achieve a high reproduction quality, a high deflection precision of the light ray must be maintained during original scanning and recording. Among those things required are that the spacings of the lines are identical and that the line starts and line ends on the surface lie on lines proceeding exactly perpendicularly to the line direction.

As a result of optical-geometrical aberrations of a deflection system, positioning errors of the deflected light ray arise on the surface, the precision being deteriorated as a result thereof.

The cause of such optical-geometrical errors, for example, are tolerances in the manufacture of the deflection system and deficiencies in the mechanical structure.

Mirror faces that are not arranged parallel to the rotational axis of the deflection system and an unstable position of the rotational axis cause positioning errors of the light ray perpendicularly vis-a-vis the line direction and, thus, cause unequal line spacings on the surface. Different angles between abutting mirror faces cause positioning errors in line direction and, thus, unequal line starts and line ends on the surface. Further positioning errors can arise due to uneven mirror faces. These positioning errors that are expressed by a non-uniform angular speed of the deflection system and, thus, by distortions within the lines are especially disturbing when a high precision or, respectively, reproduction quality is demanded.

EP-B-0054170 already discloses a means for the correction of a light ray in a flying spot laser scanner deflected by a deflection system in the form of a multi-face rotating mirror. In the known means, correction deflectors for the light ray are arranged between the laser generator for generating the light ray and the deflection system in order to compensate the positioning errors of the light ray caused by the deflection system. The positioning errors of the light ray are measured in a measurement phase preceding the actual operation. Correction values for driving the correction deflectors are then generated and the correction values are modified while constantly checking the positioning errors until the positioning errors are compensated by the correction deflectors. The correction values required for compensating the positioning errors are stored and are output for ongoing compensation of positioning errors during the actual operation synchronized with the rotational movement of the deflection system. The correction deflectors are piezoelectrically driven tilting mirrors or acousto-optical deflectors.

The known apparatus has the disadvantage that additional correction deflectors are required therein for compensating the positional errors and that the piezoelectrically driven tilting mirrors or acousto-optical deflectors have intrinsic errors that do not allow an optimum correction. For example, a piezoelectrically driven tilting mirror has a nonlinear characteristic affected with hysteresis and, due to its relatively great mass, only achieves a limited deflection speed. Added thereto is that the temperature dependency and the aging of the piezoceramic require a more frequent balancing of the apparatus.

Given an acousto-optical deflector, the optical efficiency unfavorably varies with the deflection angle and an acousto-optical deflector only allows a small ray diameter, as a result whereof its area of utilization is restricted. Moreover, a relatively involved frequency control is required for the operation of such an acousto-optical deflector.

SUMMARY OF THE INVENTION

It is therefore an object of the instant invention to recite a method and an apparatus for the correction of positioning errors of a light ray deflected across a surface point-by-point and line-by-line by a deflection system comprising at least one mirror face, whereby the above indicated disadvantages are avoided by foregoing additional correction deflectors, and high correction precisions are thus achieved.

In a method and apparatus of the invention for correction of positioning errors of a light ray deflected over a surface moving transversely vis-a-vis a line direction relative to a deflection system having at least one mirror face, and wherein the light ray is positioned point-by-point and line-by-line by the deflection system, the light ray is generated with a laser diode that is displaceable transversely vis-a-vis a direction of an emerging light ray, dependent on correction values. Before actual operation, a plurality of positioning errors of the light ray are measured for every mirror face of the deflection system in a line direction x and in a direction y perpendicular to the x direction at measuring points spaced along the line direction in a region of the surface. At least one x-correction value and one y-correction value is generated for every mirror face of the deflection system. The laser diode is displaced dependent on the y-correction values such that the light ray incident on the surface experiences a correction displacement perpendicular to the line direction for eliminating y-positioning errors. Given simultaneous checking of the positioning errors, the correction values are modified until the positioning errors are compensated, and the correction values required for compensation are stored. The stored correction values calculated for the individual mirror faces are output during actual operation synchronized with movement of the deflection system for continuous error compensation.

DE-B-3445751 discloses an apparatus for holding a plurality of light rays with respect to a prescribed optical axis, whereby the light rays are generated by laser diodes and whereby positional deviations of the light ray are measured and the identified positional deviations are leveled by displacing the laser diodes transversely relative to the optical axes of the light rays. This apparatus is based on a different object. With the assistance of the known apparatus, namely, the positions of the light rays are set such that they are focused onto a point in order to obtain a light ray having higher power or a plurality of light rays are positionally controlled such that they have identical spacings from one another. The known apparatus, however, is not suitable for high-precision compensation of positioning errors of a light ray caused by a deflection system, particularly by a multi-face rotating mirror.

The invention shall be set forth in greater detail below with reference to the figures.

BRIEF DESCRIPTION OF THE DRAWINGS

FIG. 3 is an advantageous development of the means for the correction of positioning errors; and FIG. 4 is another advantagious development.

DESCRIPTION OF THE PREFERRED EMBODIMENTS

Figure 1:
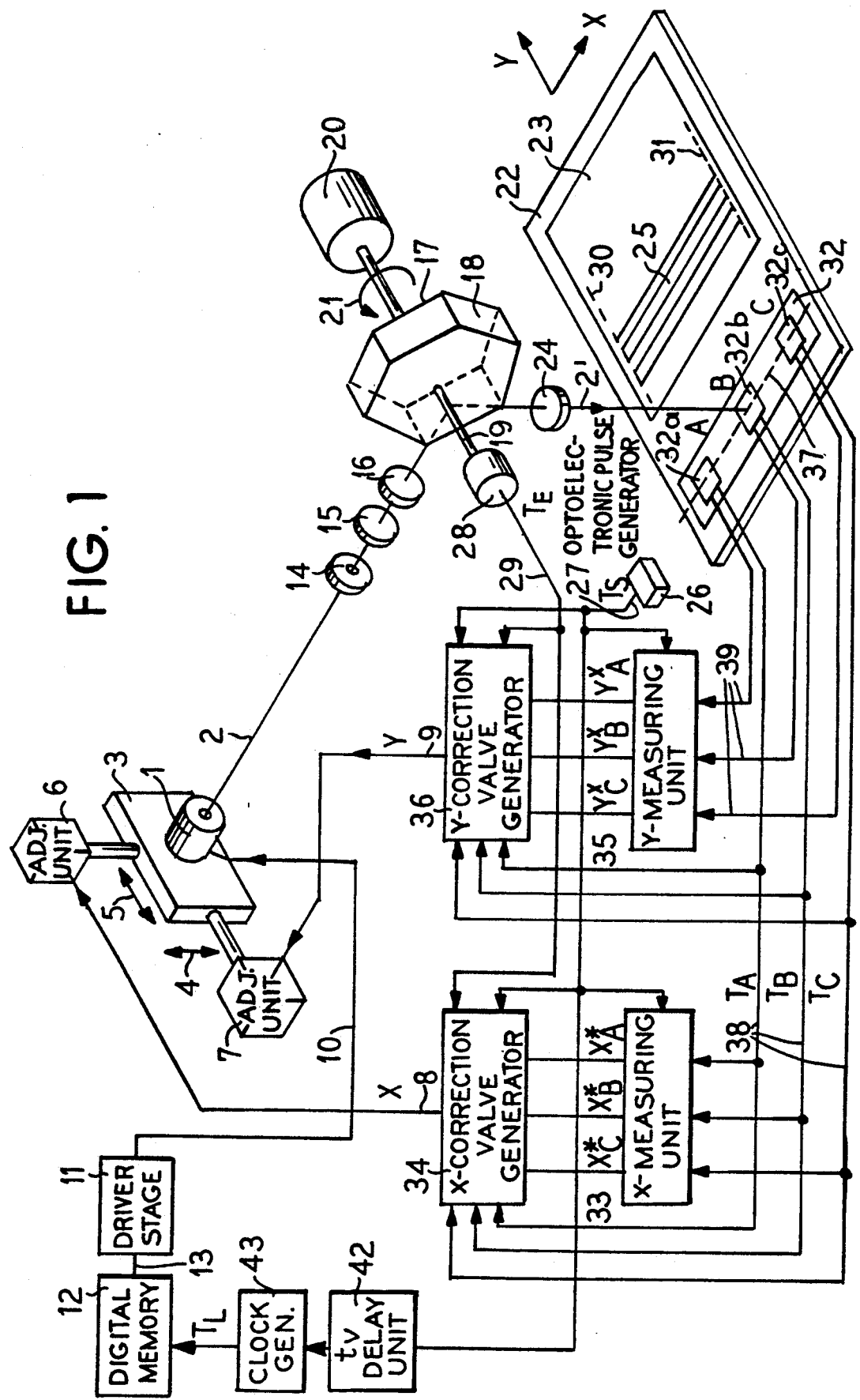
FIG. 1 shows the fundamental structure of a flying spot laser scanner as a flat bed apparatus comprising a means for the correction of positioning errors.

FIG. 1 shows the fundamental structure of a flying spot laser scanner that is fashioned as a flat bed apparatus in the exemplary embodiment and operates as an output scanner.

A laser diode 1 of, for example, type HL7801E of Hitachi generates a light ray 2. The laser diode 1 is arranged on a carriage 3 that can be displaced in coordinates in two directions 4 and 5 residing perpendicularly vis-a-vis one another and perpendicularly vis-a-vis the emerging light ray 2. A X adjustment unit 6 and a Y adjustment unit 7 each respectively contain a piezoelectric drive element (piezostack) of, for example, the type PZL 030 of Burleigh, and a high-voltage generator for the electrical drive of the drive element that, upon exploitation of the piezoelectric effect, experiences a change in length dependent on the electrical drive. The drive elements are mechanically coupled to the carriage 3 such that the length changes of the drive elements are converted into corresponding motions of the carriage 3 in the directions 4 and 5, whereby the amounts of the motions are dependent on X-correction values and Y-correction values on lines 8 and 9.

The laser diode 1 is supplied by a driver current via a line 10, this driver current being generated in a driver stage 11. The recording data required for the recording are deposited in a digital memory 12 and are called in from the digital memory 12 for information recording and are supplied to the driver stage 11 via a line 13. In the driver stage 11, the driver current for the laser diode 1 is controlled dependent on the supplied recording data and, as a result thereof, the light ray 2 emerging from the laser diode 1 is modulated in intensity.

The intensity-modulated light ray 2 is incident through an aperture diaphragm 14 for suppressing parasitic light rays and through lenses 15 and 16 for spreading the light ray 2, being incident onto a rotating multi-face rotating mirror 17 (polygonal mirror) having n mirror faces 18. The rotational axis of the multi-face rotating mirror 17 that is aligned perpendicularly vis-a-vis the optical axis of the light ray 2 is driven by a motor 20 in the direction of an arrow 21 with constant angular speed. A recording medium 23 in, for example, the form of a film is arranged on a flat bed recording carrier 22. As a result of the rotation of the multi-face rotating mirror 17, the light ray 2' reflected by the mirror faces and focused onto the recording medium 23 by an f0 correction lens 24 is constantly deflected across the recording medium 23 in line direction (recording direction; X-direction). At the same time, the flat bed recording carrier 22 executes a step-by-step or continuous feed motion (Y-direction) directed perpendicularly vis-a-vis the line direction. In this way, the light ray 21 deflected by the multi-face rotating mirror 17 exposes lines 25 lying side-by-side on the recording medium 23. Since the multi-face rotating mirror 17 in the illustrated exemplary embodiment comprises n=6 mirror faces 18, six lines 25 are thus recorded during one mirror revolution.

An optoelectronic pulse generator 26 arranged outside the flat bed recording carrier 22 and in the deflection plane of the light ray 2' generates a start pulse $(T_s)$ on a line 27 at every incident light ray 2', i.e. six start pulses $(T_s)$ per mirror revolution given n=6 mirror faces 18. A further pulse generator 28 that is coupled to the rotational axis 19 of the multi-face rotating mirror 17 generates a respective end pulse $(T_E)$ on a line 29 after each respective mirror revolution.

As already mentioned in the introduction to the specification, mirror faces 18 that are not aligned parallel to the rotational axis 19 of the multi-face rotating mirror 17 and an unstable position of the rotational axis 19 cause positional deviations of the recording light ray 2' on the recording medium 23 perpendicularly vis-a-vis the line direction, these being referred to in brief below as Y-positioning errors and resulting in unequal spacings between the lines 25.

Different angles between abutting mirror faces 18 cause different line starts and line ends from line to line. Irregularities in the mirror faces 18 lead to deviations of the recording light beam 2' from those positions in line direction that the light ray 2' should actually assume at specific times, i.e. lead to a non-uniform angular speed of the light ray. These deviations, referred to below as X-positioning errors, result in distortions within the lines 25.

What is demanded, however, for a good recording quality is that the lines 25 begin at an imaginary line 30 that proceeds perpendicularly vis-a-vis the line direction and end on a line 31 parallel thereto and that the line spacings are constant.

A measuring instrument 32 is provided for measuring the X-positioning errors and the Y-positioning errors.

The correction means for compensating the X-positioning errors comprises a X-measuring unit 33, a X-correction value generator 34 and a X-correction element that is composed of the X-adjustment stage 6 and the carriage 3 mechanically coupled thereto.

The correction means for the compensation of the Y-positioning errors comprises a Y-measuring unit 35, a Y-correction value generator 36 and a corresponding Y-correction element composed of the Y-setting stage 7 and the carriage 3.

The measuring instrument 32 in the form of a measuring rail comprises a plurality of measurement elements within the useful width of the flat bed recording carrier 22 in order to identify the ray deviations in X and Y direction, these measurement elements being arranged side-by-side on a reference line 37. In the exemplary embodiment, three measurement elements 32a, 32b and 32c are provided at the measuring points A, B and C, whereby the measuring element 32a is arranged in the region of the line start, the measuring element 32c is arranged in the region of the line end and the measuring element 32b is arranged approximately in the middle of the line. The measuring instrument 32 is a fixed component part of the flat bed recording carrier 22. Alternatively thereto, the measuring instrument 32 can be secured to the flat bed recording carrier 22 only for the purpose of measuring the positioning errors or can be inserted into the beam path instead of the flat bed recording carrier 22.

The positioning errors are identified in a measuring phase preceding the recording wherein the multi-face rotating mirror 17 rotates and the flat bed recording carrier 22 is displaced to such an extent in Y-direction that the measuring elements 32a, 32b and 32c lie in the deflection plane of the light ray 2', as shown in FIG. 1. For identifying the X-positioning errors, differential measurements of the running time for the light ray 2' between the pulse generator 26 and the measuring element 32a ($\Delta t_1$), between the measuring elements 32a and 32b ($\Delta t_2$), as well as between the measuring elements 32b and 32c ($\Delta t_3$) are implemented. The pulses measured in the pulse generator 26 and in the measuring elements 32a, 32b and 32c when swept by the light ray 2' are supplied to the X-measuring unit 33 via the line 27 and via the line 38 and are employed therein for differential measurement. The measured time differences ($\Delta t_1$, $\Delta t_2$ and $\Delta t_3$) are converted into the measured value triplets $X^*_A$, $X^*_B$ and $X^*_C$ for every mirror face 18 of the multi-face rotating mirror 17.

The Y-positioning errors measured by the measuring elements 32a, 32b and 32c in the individual measuring points A, B and C along the line direction are transmitted into the Y-measuring stage 35 via lines 39 and are converted therein into the measured value triplets $Y^*_A$, $Y^*_B$ and $Y^*_C$ for every mirror face 18 of the multi-face rotating mirror 17.

In a correction phase following upon the measurement phase, the X-correction value generator 34 and the Y-correction value generator 36 generate correction value triplets $X_A$, $X_B$ and $X_C$ as well as $Y_A$, $Y_B$ and $Y_C$ that change in the direction of the required correction and that are serially forwarded via the lines 8 and 9 to the X-setting stage 6 and to the Y-setting stage 7 in agreement with that mirror face 18 of the multi-face rotating mirror 17 just situated in the beam path of the light ray 2. The setting stages 6 and 7 displace the carriage 3 in the directions 4 and 5 in accordance with the correction values output by the X-correction value generator 34 and by the Y-correction value generator 36. As a result thereof, the deflected light ray 2' is deflected in the line direction on the basis of a displacement of the laser diode 1 in the direction of the arrow 4 for the purpose of correcting its X-positioning errors, and it is deflected perpendicularly relative to the line direction by shifting the laser diode 1 in the direction of the arrow 5 for the purpose of correcting its Y-positioning errors.

The step-by-step correction of the positioning errors is continued until the measured deviations are compensated. The correction values thereby achieved are stored in the corresponding correction value generators 34 and 36 and are output during the actual recording phase for continuous correction of the positioning errors. In the recording phase, the start pulses ($T_s$) are delayed in a delay unit 42 by that time which corresponds to the running time of the light ray 2' between the pulse generator 26 and the desired line start on the recording medium 23. A clock generator 43 generates the read clock for the digital memory 12. Every retarded start pulse ($T_s$) restarts the read clock, so that the respectively first image information of a line is read out and recorded at exactly the desired line start.

Figure 2:
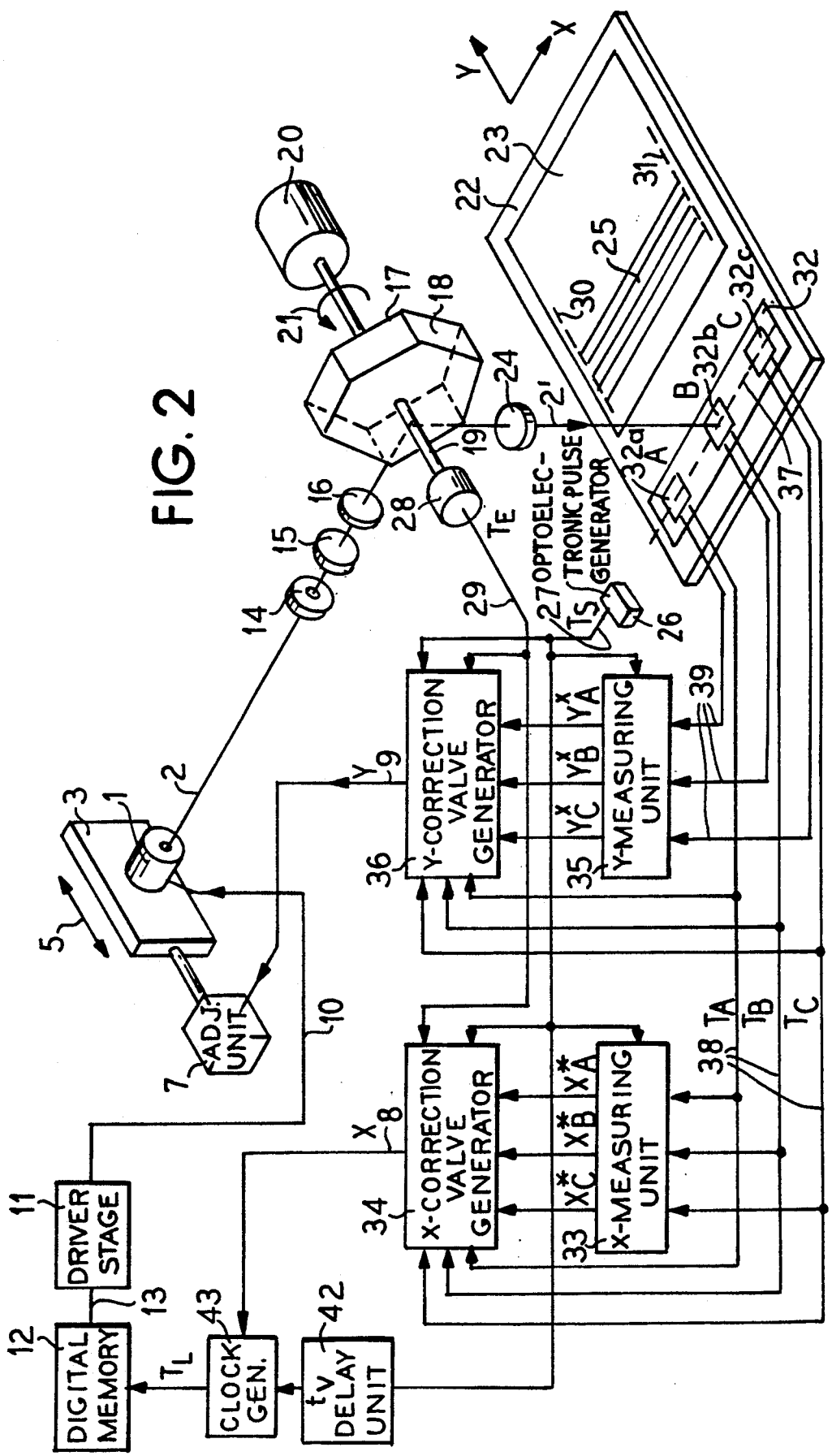
FIG. 2 is another exemplary embodiment of a means for the correction of positioning errors.

EP-B-0054170 is referenced with respect to a more detailed disclosure of the measuring instrument 32, of the measuring units 33 and 35 and of the correction value generators 34 and 35. FIG. 2 in this publication shows an exemplary embodiment of the measuring instrument 32 and of the Y-measurement unit 35; FIG. 4 therein shows an exemplary embodiment of the X-measuring unit 33 and FIG. 5 therein shows an exemplary embodiment of the X-correction value generator 34 or, respectively, of the identically constructed Y-correction value generator 36.

In a development for improving the correction precision, the X-correction value generator 34 and the Y-correction value generator 36 each comprise an interpolation stage wherein a correction function $X = f(x)$ or, respectively, $Y = f(x)$ is formed for every mirror face 18 of the multi-face rotating mirror 17 from every correction value triplet $X_A$, $X_B$ and $X_C$ or, respectively, $Y_A$, $Y_B$ and $Y_C$ by linear interpolation, whereby (x) is the distance within a mirror face traversed by the deflected light ray 2'. In this way, a correction value is defined for every point of incidence of the deflected light ray 2' and a continuous error correction within every mirror face 18 is implemented, as a result whereof, in particular, errors caused by non-planar or uneven mirror faces are compensated and high precisions are achieved.

Both X-positioning errors as well as Y-positioning errors are compensated in the correction means of FIG. 1. It lies within the scope of the invention to modify the correction means such that only the X-positioning errors or only the Y-positioning errors are respectively corrected as needed.

The flying spot laser scanner was designed as a flat bed apparatus in the exemplary embodiment of FIG. 1. Of course, the flying spot laser scanner can also be a drum apparatus. In this case, the multi-face rotating mirror 17 is arranged with reference to the drum such that the deflected light ray 2' is guided over the surface of the drum in an axial direction (line direction). In the measurement phase, the measuring instrument 32 is then positioned vis-a-vis the drum such that the reference line 37 proceeds in the axial direction.

FIG. 2 shows a modification of the correction means of FIG. 1. The difference compared to FIG. 1 is comprised therein that the correction of the X-positioning errors does not occur by displacing the carriage 3 with the laser diode 1 in the direction of the arrow 4, but on the basis of a corresponding output control of the recording data from the digital memory 12. The X-setting stage 6 is thus eliminated in this embodiment and the carriage 3 is constructed correspondingly simpler since this need execute a displacement only in the direction of the arrow 5.

The X-correction values output from the X-correction value generator 34 now proceed via the line 8 into the clock generator 43 and control the frequency of the read clock sequence ($T_L$) for the digital memory 12.

The frequency control occurs in such a way that the chronological spacings of the data output are varied dependent on the identified X-positioning errors of the light ray 2' and the X-positioning errors are thus compensated by an appropriate compression or elongation of the lines. Alternatively to a frequency variation of the read clock sequence ($T_L$), a delay element controlled by the X-correction values can also be provided between the digital memory 12 and the driver stage 11.

FIG. 3 shows an advantageous development of the correction means of FIG. 2 for improving the correction precision.

The piezoelectric drive element in the Y-setting stage 7 has a non-linear characteristic, i.e. the relationship between the electrical correction values and the length changes or, respectively, the displacement of the carriage 3 executed by the drive element in response thereto is not linear. This non-linear characteristic of the drive element is automatically compensated in the correction phase in the positioning error correction. In the working phase wherein the correction of the positioning errors occur based on the measure of the correction values calculated in the measuring phase without another measurement of the errors, however, the non-linear characteristic of the drive element can change due to temperature influences and aging. In this case, the carriage 3 does not achieve the rated positions prescribed by the correction values, this potentially leading to faulty correction deflections of the light ray 2' and, thus, to faulty corrections of the positioning errors.

For this reason, a control loop is advantageously introduced into the correction means of FIG. 3, the positioning errors of the carriage 3 and, thus, of the laser diode 1 being automatically leveled therewith.

For this purpose the actual positions of the laser diode 1 are first continuously measured in the direction of the arrow 5 in that a measuring ray 44 is diverted from the light generated by the laser diode 1 outside the useful aperture of the laser diode 1 and is focused onto a position detector 46 with a lens 45. The position detector 46 supplies signal values that are a measure for the measured actual positions of the laser diode 1, these are supplied to a comparator 48 via a line 47. The correction values read out from the Y-correction value generator 36, these representing a measure for the rated positions of the laser diode 1, are forwarded to the comparator 48 via the line 9. The positional deviations between the rated and actual positions of the laser diode 1 are thus identified in the comparator 48 and are forwarded for controlling the Y-setting stage 7 as signals via the line 41'. For example, the position detector 46 can be a differential photodiode.

Such a control loop, of course, can also be connected in the correction means of FIG. 1 between the X-correction value generator 34 and the X-setting stage 6 and the or between Y-correction value generator 36 and the Y-setting stage 7.

The temperature and long-term behavior of the piezoelectric drive elements is thus compensated by the control loop, as a result whereof the precision of the correction of the positioning errors is advantageously enhanced and the required frequency of the balancing procedures is reduced.

FIG. 4 shows another development that can be employed in the apparatus of FIGS. 1 through 3.

It has proven expedient to regulate the temperature of the housing of the laser diode 1 for enhancing the precision of the correction. For this purpose, a temperature sensor 50 that is thermally coupled to the housing of the laser diode 1 is located on the carriage 3. The temperature sensor 50 forwards a signal dependent on the measured temperature to a temperature-regulating unit 52 via a line 51, this unit generating a corresponding control current on a line 52 for a cooling element 53 (Peltier element). The stationary cooling element 53 is thermally connected to the movable carriage 3 via a flexible temperature transfer bridge 54. Corresponding to the required variation in temperature, the control current cools or heats the cooling element 53, whereby heat is transported to or eliminated from the carriage 3 via the temperature transfer bridge 54.

Although various minor changes and modifications might be proposed by those skilled in the art, it will be understood that I wish to include within the claims of the patent warranted hereon all such changes and modifications as reasonably come within by contribution to the art.

I claim:

1. A method for correction of positioning errors of a light ray deflected over a surface moving transversely vis-a-vis a line direction relative to a deflection system having at least one mirror face, the light ray being positioned point-by-point and line-by-line by said deflection system, comprising the steps of:
   generating the light ray with a laser diode that is displaceable transversely vis-a-vis a direction of an emerging light ray, dependent on correction values;
   before actual operation, measuring a plurality of positioning errors of the light ray for every mirror face of the deflection system in a line direction X and in a direction Y perpendicular to the X direction at measuring points spaced along said line direction in a region of the surface;
   generating at least one X-correction value and one Y-correction value for every mirror face of the deflection system;
   displacing the laser diode dependent on the Y-correction values such that the light ray incident onto the surface experiences a correction displacement perpendicular to the line direction for eliminating Y-positioning errors;
   given simultaneous checking of the positioning errors, modifying the correction values until the positioning errors are compensated, and storing the correction values required for compensation; and
   outputting the stored correction values calculated for the individual mirror faces during actual operation synchronized with movement of the deflection system for continuous error compensation.

2. A method according to claim 1 including the step of displacing the laser diode dependent on the X-correction values such that the light ray incident onto the surface experiences a correction displacement in the line direction for eliminating X-positioning errors.

3. A method according to claim 1 including the steps of
   intensity-modulating the light ray dependent on an image signal for a line-by-line recording on the surface; and
   correcting the X-positioning errors line-by-line by a variation in a running time of the image signal controlled by the X-correction values.

4. A method according to claim 1 including the steps of intensity-modulating the light ray dependent on image data for a line-by-line recording on the surface, said image data being read from a storage medium with a read clock; and correcting the X-positioning errors by a variation of a frequency of the read clock controlled by the X-correction values.

5. A method according to claim 1 including the step of generating correction functions by interpolation from allocated correction values for every mirror face.

6. A method according to claim 1 including the step of employing a rotating polygon mirror having a plurality of mirror faces as a deflection system.

7. A method according to claim 1 including the steps of
employing a photoelectrical measuring element having two photosensitive surfaces arranged transversely relative to the line direction for identifying the Y-positioning errors; and
integrating the photocurrents of the surfaces, and calculating the Y-positioning errors by forming a difference between the integrated photocurrents.

8. A method according to claim 1 including the step of employing a differential photodiode as the measuring element.

9. A method according to claim 1 including the step of identifying the X-positioning errors by measurements of the differences in running time of the light ray between measuring points.

10. A method according to claim 1 including the step of regulating a temperature of a housing of the laser diode emitting said light ray to a constant value.

11. A method according to claim 1 wherein the light ray is intensity-modulated by the laser diode.

12. A method according to claim 1 including the steps of:
identifying real actual positions of the laser diode in the displacement of the laser diode;
comparing the actual positions to the rated positions of the laser diode prescribed by the correction values; and
controlling the displacement of the laser diode by positional deviations identified in the comparison.

13. A method according to claim 12 including the steps of
diverting a measuring ray lying outside a useful aperture of the laser diode from the light ray generated by the laser diode; and
identifying the actual positions of the laser diode by identifying the position of the measuring ray with assistance of a position detector.

14. An apparatus for correction of positioning errors of a light ray deflected over a surface moving transversely vis-a-vis a line direction relative to a deflection system having at least one mirror face, the light ray being positioned point-by-point and line-by-line by a deflection system, comprising:
laser diode means for generating the light ray to be deflected;
a displaceable carriage on which the laser diode means is arranged;
a measuring instrument means arranged at the surface and comprising a plurality of measuring elements aligned in a line direction for measuring deviations of the deflected light ray at the surface;
X-measuring unit means and Y-measuring unit means connected to the measuring elements for calculating X-positioning errors of the light ray in the line direction and Y-positioning errors perpendicularly to the line direction from the measured deviations;
X-correction value generator means and Y-correction value generator means that re respectively connected to the X-measuring unit means and to the Y-measuring unit means for generating, modifying and storing X-correction values and Y-correction values;
a Y-setting stage means controllable by the Y-correction values and which is connected to the Y-correction value generator means and which is mechanically coupled to the carriage for displacing the carriage such that the deflected light ray experiences a correction displacement perpendicularly relative to the line direction in order to eliminate the Y-positioning errors; and
means for synchronization of the correction values output from the correction value generator means with movement of the deflection system.

15. An apparatus according to claim 14 including an X-setting stage means controllable by the X-correction values which is connected to the X-correction value generator means and is mechanically coupled to the carriage for displacing the carriage such that the deflected light ray experiences a correction displacement in the line direction for eliminating the X-positioning errors.

16. An apparatus according to claim 14 for line-by-line recording on the surface including:
a digital memory means for storing image data;
a driver stage means connected to the digital memory means and to the laser diode means for intensity-modulation of the laser diode means dependent on the image data; and
clock generator means connected to the digital memory means and to the X-correction value generator means for generating a read clock for the digital memory means, whereby the read clock is varied in frequency by the X-correction values for eliminating the X-positioning errors.

17. An apparatus according to claim 14 wherein the measuring elements for the Y-deviations are differential photodiodes.

18. An apparatus according to claim 14 including
a lens means arranged in the light ray of the laser diode means for generating a measuring ray lying outside a useful aperture of the laser diode means;
a position detector means lying in the measuring ray for identifying actual positions of the laser diode means; and
at least one comparator means whose inputs are connected to the position detector means and one of the correction value generator means and whose output is connected to one of the setting stage means.

* * * * *